United States Patent [19]

Egli

[11] Patent Number: 4,648,716
[45] Date of Patent: Mar. 10, 1987

[54] DISCRIMINANT APPARATUS FOR A RING LASER ANGULAR RATE SENSOR

[75] Inventor: Werner H. Egli, Minneapolis, Minn.

[73] Assignee: Honeywell Inc., Minneapolis, Minn.

[21] Appl. No.: 421,598

[22] Filed: Sep. 22, 1982

[51] Int. Cl.⁴ .............................................. G01B 9/02
[52] U.S. Cl. ...................................... 356/350; 372/94
[58] Field of Search ........................... 356/350; 372/94

[56] References Cited

U.S. PATENT DOCUMENTS

| 3,373,650 | 3/1968 | Killpatrick | 372/94 |
| 3,467,472 | 9/1969 | Killpatrick | 372/94 |
| 3,937,578 | 2/1976 | Andringa | 372/94 |
| 4,152,071 | 5/1979 | Podgorski | 356/350 |
| 4,248,534 | 2/1981 | Elbert | 356/350 |
| 4,422,762 | 12/1983 | Hutchings et al. | 356/350 |
| 4,445,779 | 5/1984 | Johnson | 356/350 |

Primary Examiner—Stephen C. Buczinski
Attorney, Agent, or Firm—Robert A. Pajak

[57] ABSTRACT

The present invention provides a discriminant signal apparatus for providing a discriminant signal indicative of the lock-in rate. The discriminant signal apparatus of the present invention is responsive to the behavior of the instantaneous phase difference between the waves, and specifically the behavior of the phase difference occurring substantially about, both before and after, occurrences of the first derivative of the phase difference having substantially zero value.

14 Claims, 7 Drawing Figures

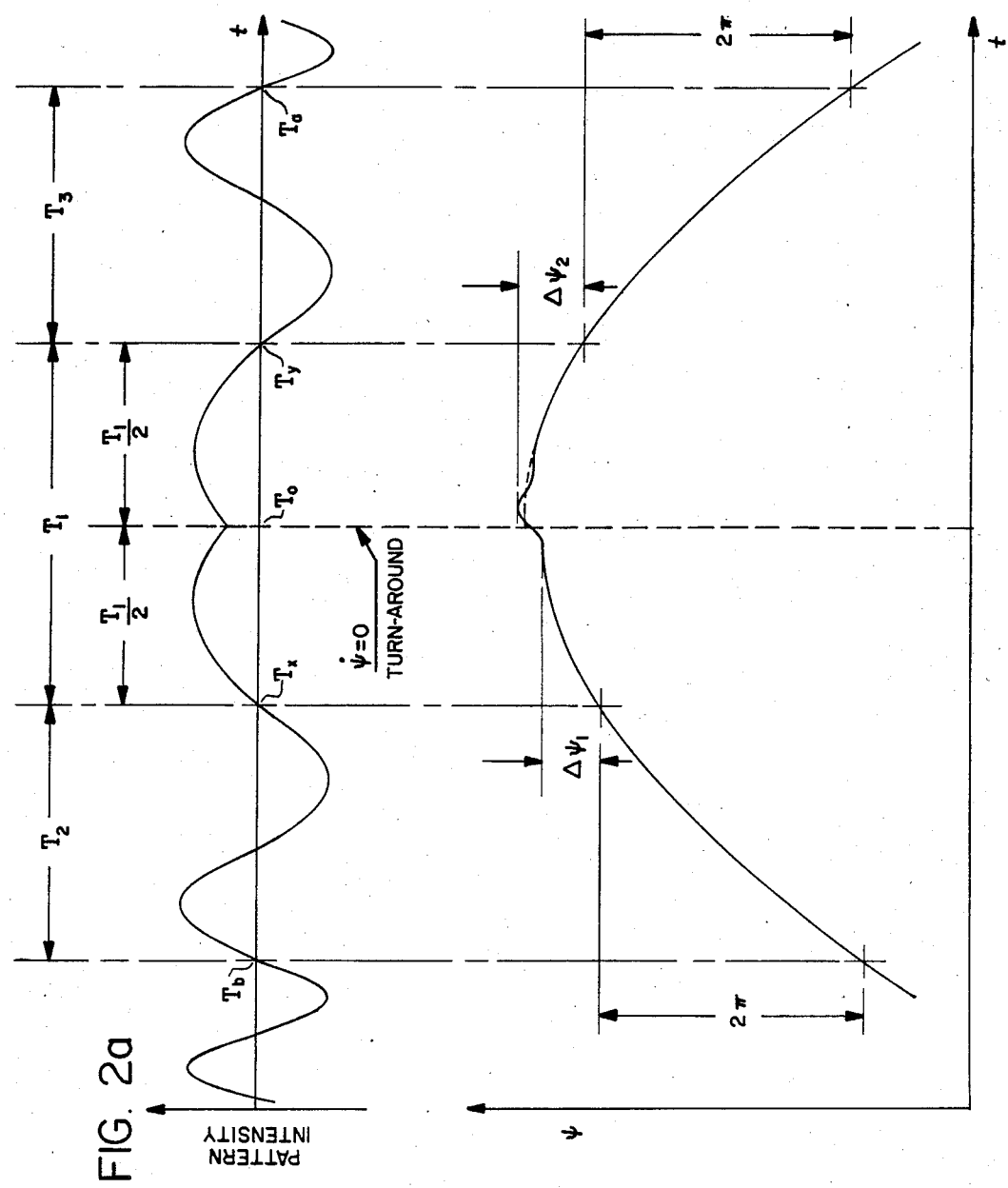
FIG. 2a
FIG. 2b
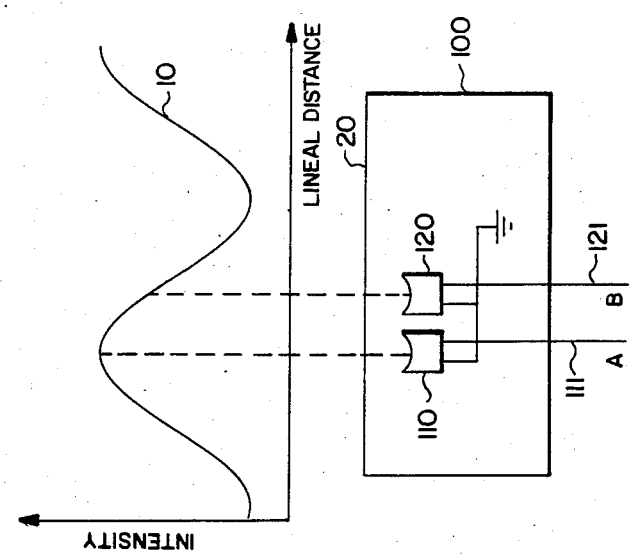
FIG. 1

DISCRIMINANT APPARATUS FOR A RING LASER ANGULAR RATE SENSOR

Reference is hereby made to U.S. Pat. No. 3,373,650, entitled, "Laser Angular Rate Sensor," and U.S. Pat. No. 3,467,472, entitled "Random Bias For A Laser Angular Rate Sensor," both by J. E. Killpatrick, and U.S. Pat. No. 4,152,071, by Theodore J. Podgorski, entitled, "Control Apparatus," which are assigned the same assignee as the present application.

The present invention relates to a ring laser angular rate sensor. Specifically, the present invention provides a discriminant apparatus which provides an output signal related to the lock-in rate of the sensor, and which may be employed in a closed-loop control system for altering the ring laser in such a way so as to reduce the lock-in rate thereof.

In a simple ring laser angular rate sensor, sometimes referred to as a ring laser gyro, two electromagnetic waves in the form of monochromatic beams of light are generated to propagate in opposite directions substantially along an optical closed-loop path which defines the input axis about which the rotation rate is to be sensed. The optical closed-loop path is made up of at least a plurality of straight line segments along which the beams of light propagate in opposite directions about a resonant structure. The closed-loop path is substantially defined by a plurality of wave reflecting surfaces such as mirrors. Along the closed-loop path coupling of energy occurs between each of the waves due to such contributors, among others, as backscattering at the wave reflecting surfaces and losses through the medium. Coupling of energy between the waves results in the phenomena known as "lock-in." Lock-in is a situation where the frequency of each of the waves locks in to a common frequency. "Lock-in rotation rate" is the rate of rotation of the sensor below which there is no discernible frequency difference to obtain a measurement of rotation.

Sensors of the class described may be provided with a frequency biasing means so that measurement of rotation rates below the lock-in rate may be obtained. Frequency biasing may be provided by a variety of techniques such as those taught in U.S. Pat. Nos. 3,373,650 and 3,467,472 where the frequency difference periodically alternates in sign. Frequency bias may also be provided by sufficient frequency separation of the frequencies of the counter-propagating waves. The frequency bias may be introduced by rotationally oscillating the sensor, back and forth, or by rotating the sensor at a sufficiently high constant rate. Further, the frequency bias may be introduced by a frequency separating means in the optical path of the waves such as a Faraday cell. The frequency separation or bias provided by such a cell may be oscillated or may just provide a constant frequency separation. These and other techniques are well known in the art.

Sensors with a varying frequency bias are commonly referred to as dithered gyros. Unfortunately, associated with dithered gyros is an error term commonly referred to as random drift. Random drift is rotation output error which is due to lock-in which is brought about as the varying frequency difference goes through zero. A minimum lock-in results in minimum random drift. Furthermore, a minimum lock-in rate optimizes sensor scale factor which is particularly significant in sensors with constant rate bias.

U.S. Pat. No. 4,152,071 discloses a control apparatus for minimizing lock-in rate. In essence, minimum lock-in rate is obtained by altering the lasing path in such a manner so as to reduce the coupling of energy to a condition at which the minimum lock-in rate exists. This may be accomplished by a variety of techniques including altering the actual optical closed-loop path or by affecting the lasing medium. Specifically, U.S. Pat. No. 4,152,071 shows a pair of mirrors which substantially define a closed-loop path of a laser angular rate sensor. The pair of mirrors are positionally moved in translation in a push-pull arrangement by a single feedback control system so as to alter the position of the closed-loop path or lasing path of a resonant cavity system so as to actively control the lock-in rate of the sensor at a minimum value.

The invention of U.S. Pat. No. 4,152,071 requires a discriminant signal indicative of the lock-in rate. This is achieved in U.S. Pat. No. 4,152,071 by detecting the intensity variations of one of the counter-programming waves of the ring laser. These intensity variations are indeed indicative of the coupling of energy between the waves. Since the lock-in rate is related to the value of the coupling of energy between the waves, both magnitude and phase, the intensity variations as aforesaid provides the necessary discriminant signal indicative of the lock-in rate.

SUMMARY OF THE INVENTION

The present invention provides a discriminant signal apparatus for providing a discriminant signal indicative of the lock-in rate. The discriminant signal apparatus of the present invention is responsive to the behavior of the instantaneous phase difference between the waves, and specifically the behavior of the phase difference occurring substantially about, both before and after, occurrences of the first derivative of the phase difference having substantially zero value.

Further, the discriminant apparatus of the present invention may be employed in a closed-loop control system for altering the lasing path in such a manner so as to reduce the coupling of energy between the waves in such a way so as to maintain the sensor in a condition having minimum lock-in rate.

BRIEF DESCRIPTION OF THE DRAWINGS

FIG. 1 is a diagrammatic representation of a typical output scheme used in a ring laser gyro which provide an indication of the phase difference between the laser beams.

FIG. 2a is a graphical representation of a single output of the output scheme shown in FIG. 1 occurring substantially about a first derivative value of the phase difference going through zero.

FIG. 2b is a graphical representation of the phase difference between the laser beams which corresponds to the output signal indicated in FIG. 2a.

DESCRIPTION OF THE INVENTION

Figure 3A:
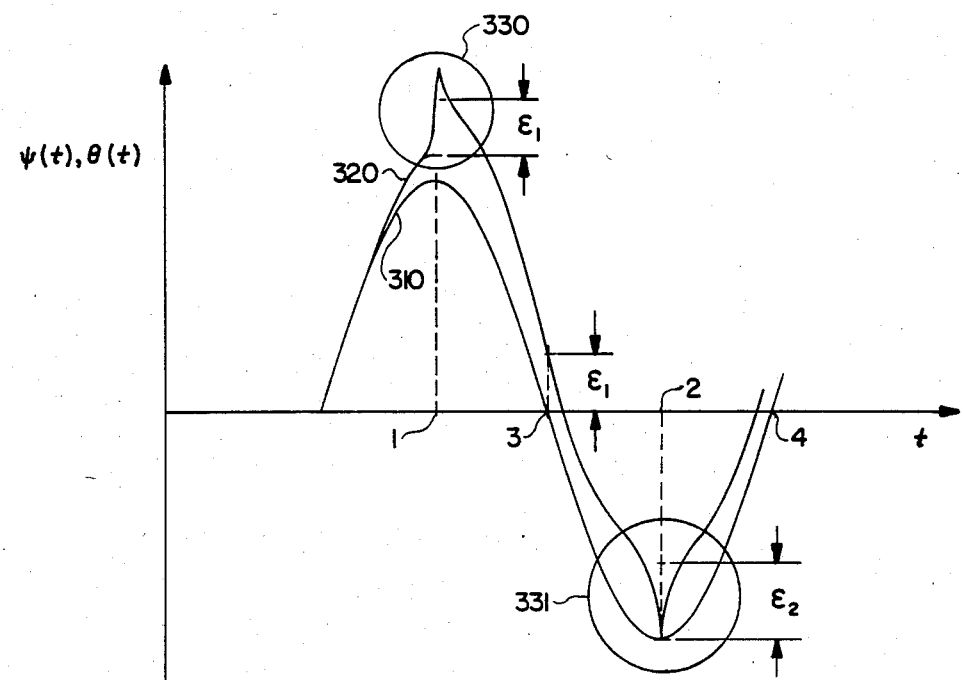
FIGS. 3a and 3b are graphical representations of the behavior of the phase difference occurring substantially about a first derivative value of the phase difference going through zero.

A ring laser angular rate sensor system generally consists of a lasing medium providing two substantially monochromatic beams or waves of electromagnetic energy in the form of beams of light, a plurality of reflectors or mirrors defining an optical closed-loop path and an enclosed area, the two beams of light being directed to travel along the optical closed-loop path in opposite directions. A scheme for monitoring the behavior of the counter-traveling beams in order to determine the frequency difference therebetween, which is indicative of the rotation of the closed-loop path, may have one of the plurality of the reflectors being slightly transparent so as to emit a portion of each of the counter-propagating waves. These waves are combined by an optical system so as to heterodyne a portion of each of the waves to form an interference pattern as is substantially shown in FIG. 1 and will be briefly described here.

Referring to FIG. 1, a graphical representation of a common interference pattern produced by the output scheme just indicated is shown. The graph is a representation of interference pattern intensity versus lineal distance. Also shown in FIG. 1 is signal means 100, commonly used in the art, responsive to the interference pattern which is projected on a surface 20 of signal means 100. Signal means 100 comprises at least one photodetector 110 having an output signal 111 indicated by the letter "A". In order to ascertain a direction of movement of the interference pattern, signal means 100 may employ a second photodetector 120 having an output signal 121 which is indicated by the letter "B".

As is well known, the intensity of light on surface 206 is indicative of the instantaneous phase difference between the two counter-traveling laser beams or waves of the ring laser. When the sensor is not rotating, the intensity at any point on the surface 20 remains constant. In the presence of rotation above the lock-in rate, the intensity changes with time between maximums and minimums at a rate proportional to the rotation rate sensed by the sensor. In this manner, optical information is presented on surface 20 of signal means 100 for transduction into different signals such as electrical signals by photodetectors 110 and 120. The combined intensity detected at a particular point on the surface 20 gives a relative indication of the instantaneous phase difference between the two counter-traveling beams. The "relative phase difference" is clearly exemplified by noting the difference in intensity detected by photodetector 110 compared with the intensity detected by photodetector 120, at two different points on the surface 20. The intensities detected by photodetectors 110 and 120 are, of course, relative since they depend upon their position relative to surface 20 and the projected interference pattern.

It is well known, in the presence of rotation, the interference pattern moves with time. In operation the photodetector provides electrical signals directly related to the intensity of the interference pattern created on the surface 20. These signals are usually amplified and then processed to determine the rotation rate of the ring laser sensor as well as the angular displacement for determining navigational position. The interference pattern and corresponding signal means 100, well known in the art, is derived from the frequency or phase behavior of the counter-traveling waves. Thus, the sensor output signal thereof will, of course, include lock-in error if the wave frequencies lock-in.

As indicated earlier, disclosed in U.S. Pat. No. 3,373,650 is a ring laser angular rate sensor in which the frequencies of the two counter-traveling beams of light are provided with a periodically reversing or alternating bias so that a time varying frequency difference exists therebetween for a majority of the time so that a time-integrated frequency difference between the two beams of light is substantially zero after one complete cycle of the periodically alternating bias. The bias provided need not be periodic, that is perfectly repetitious, but rather provide a bias which causes the frequency difference between the counter-traveling beams to change in regular though not necessarily periodic intervals. For purposes of ease of exposition and as a matter of practicality, a periodic alternating bias will be assumed.

An alternating bias may be achieved mechanically by providing a rotational motion of the optical closed-loop path or may be achieved by directly effecting a frequency change in two counter-traveling beams by, for example, directly affecting the lasing path or lasing medium, these methods being referred to in U.S. Pat. No. 3,373,650 as electrical or optical biasing. Optical biasing may be provided by inserting a Faraday cell or a birefringence element in the path of the waves as is well known.

Consider now the sensor output interference pattern resulting from a periodically alternating sinusoidal bias provided by rotational oscillation of the sensor. In these circumstances, the output interference pattern motion would result in the photodetector output signal, A or B, to be sinusoidal since the induced rotational oscillation is sinusoidal in form. Therefore, during each cycle of oscillation, the direction of rotation changes twice. About each instant of direction change, the rate of change in the intensity pattern decreases to zero—corresponding to a frequency difference of zero, and then begins to increase. Shown in FIG. 2a is a graphical representation of a typical sensor output interference pattern intensity versus time substantially around the instant of directional rotation change in such a biased sensor. Each of the photodetectors 110 and 120 of signal means 100 would have a corresponding output similar in form. In FIG. 2a, the turnaround instant is indicated by the time $T_0$.

As is well known, one complete interference fringe spacing change corresponds to a phase difference change of $2\pi$ radians between the two counter-propagating waves. This is substantially shown in the time intervals indicated by $T_2$ and $T_3$, and is graphically illustrated in FIG. 2b. FIG. 2b is a graphical representation of the phase difference between the waves versus time which in actuality produced the resulting interference pattern shown in FIG. 2a. In the interval designated $T_1$, the turnaround instant has occurred. As will be shown, the angle at the turnaround instant and its behavior based on the characteristic behavior of the phase difference before and after the turnaround instance may be utilized as a discriminant signal indicative of the lock-in rate.

For ease in understanding the invention, in the following discussion it is assumed that there is no other inertial space base motion which is normally to be sensed by the ring laser sensor. Therefore, the sensor responds only to the dither motion.

It can be mathematically shown that an incremental lock-in error occurs substantially about the instance of turnaround and can be derived from what is known as the lock-in equation (Aronowitz, Laser Applications, Volume 1, 1971) from which the lock-in error can be shown to be:

$$\Delta E = \frac{\Omega_L}{\sqrt{\ddot{\psi}}} \sin(\psi_o + \alpha) \quad (1)$$

where:

$\Omega_L$ is the sensor lock-in rate
$\ddot{\psi}$ is the angular acceleration through turnaround
$\alpha$ is some unknown phasing constant
$\psi_o$ is the value of the turnaround instant phase angle
$\Delta E$ is incremental angular error or incremental lock-in error value.

The incremental lock-in error value occurs substantially about the point of rotation direction reversal where $\dot{\psi}$ is zero, which will hereafter be called the zero rate crossing (ZRC). This is not to be confused with the change in polarity of a dithering bias. In the presence of inertial space motion added to the dither motion, the zero rate crossing does not occur at the same time as the bias changes polarity, although it is very close at turning rates which are small compared to the bias rate. The effects of the incremental lock-in error value upon the gyro output is graphically illustrated in FIG. 3a. In FIG. 3a, curve 310 is a graphical representation of the actual rotation of the gyro, $\theta(t)$, versus time. Curve 310 represents the chosen sinusoidal dithering motion provided by a mechanical biasing means for rotating the optical closed-loop path back and forth.

Also in FIG. 3a is a curve 320 which is a graphical representation of the output phase angle, $\psi(t)$, versus time corresponding to the input motion represented by curve 310. Two successive zero rate crossings are indicated by the timing points "1" and "2". Because of the lock-in error which occurs substantially about the zero rate crossing, a step or perturbation in the value of $\psi(t)$ is shown occurring at timing points "1" and "2" in the plot of $\psi(t)$ versus time. The magnitude of these steps or perturbations in $\psi(t)$ correspond to incremental lock-in error values contained in a typical gyro output provided by a typical sensor output means for obtaining rotational data.

The incremental lock-in error value occurring about the zero rate crossing at point "1" is indicated as an offset $\epsilon_1$. At point 3, $\theta(t)$ is again zero, but $\psi(t)$ is not. The error $\epsilon_1$ at point 3 is commensurate with the step change at the zero rate crossing at point 1. The offset $\epsilon_1$ shows up as an angular rotation error in the gyro output proportional to $\epsilon_1$ following the ZRC at point 1. If there was no lock-in error, there would be no offset and no angular rotation error. Further, at the next ZRC crossing at point 2, another error $\epsilon_2$ occurs, which contributes to an accumulative error known as random drift. This is so for each ZRC.

The invention of the present application is a novel method and corresponding apparatus for obtaining a discriminant signal based substantially on the incremental lock-in error value which usually accumulates in a usual sensor output after each passing through a zero rate crossing. The variation in the lock-in error value observed by a history of the lock-in error values can be utilized as a discriminant signal indicative of the lock-in rate. In the invention of the present application, the incremental lock-in error values are obtained by:

(i) characterizing the behavioral function of $\psi(t)$ by a first characteristic function $\psi^b(t)$ determined by $\psi(t)$ data "before" an occurrence of the zero rate crossing so that the value of $\psi_o^b(t)$ at the zero rate crossing can be extrapolated therefrom;

(ii) characterizing the behavioral function of $\psi(t)$ by a second characteristic function $\psi^a(t)$ determined by $\psi(t)$ data "after" the last zero rate crossing so that the value of $\psi_o^a(t)$ at the last zero rate crossing can be extrapolated therefrom; and (iii) determining an incremental lock-in error value which is the difference value between the values of $\psi_o^b(t)$ and $\psi_o^a(t)$ at the same zero rate crossing determined by the first and second characteristic functions $\psi^b(t)$ and $\psi^a(t)$.

The difference value as aforesaid of each zero rate crossing corresponds to the contribution of lock-in error which is contained in the usual sensor output derived from the phase angle information. In the present invention, the historical variation in the difference value, that is, how the incremental lock-in error historically varies based on a number of ZRC's is a measure of the coupling of energy between the waves and thus is indicative of the lock-in rate and can be used as a discriminant signal.

Figure 3B:
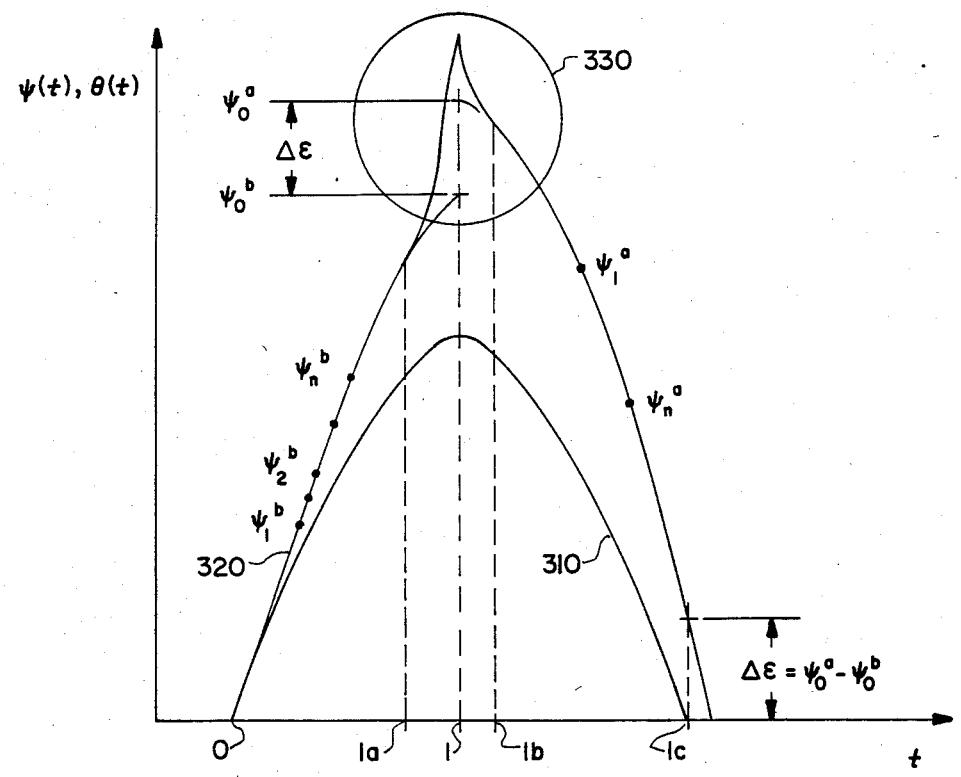

The principle of measuring the incremental lock-in error at the zero rate crossing based on "before" and "after" characteristic functions is illustrated in FIGS. 3a and 3b. As before, curve 310 represents chosen sinusoidal dithering input motion to the sensor, curve 320 represents the phase angle output normally processed by the typical sensor output sensing scheme for measuring rotation rate, and zero rate crossings are indicated by numerals "1" and "2" on the time axis. If there were no lock-in error, curve 320 would have exactly the same shape, namely sinusoidal, as curve 310. However, because of lock-in error a perturbation exists about the zero rate crossing as indicated in the area circumscribed by circles 330 and 331. Such perturbations occur at each subsequent zero rate crossing, and the magnitude of each perturbation is dependent on the sensor "lock-in rate."

It should be noted that the difference between $\psi_o^b$ and $\psi_o^a$ may include two components, namely: (i) the incremental lock-in error as aforesaid, but also (ii) a substantially constant measurement difference which is associated with measurement hardware. The constant difference component may be eliminated by determining the average of $\psi_o^b$ less $\psi_o^a$ seen over all ZRC's and subtracting this latter mentioned average quantity from the "$\psi_o^b - \psi_o^a +$" reading.

FIG. 3b is an expanded diagrammatic representation of rotation curve 310 and a corresponding output phase information indicated by curve 320 for the first half cycle of curve 310 shown in FIG. 3a. Associated with each half cycle of curve 310 is a polarity of the second derivative of dither motion as well as the corresponding second derivative of the phase difference. In the time interval between 0 and 1a, curve 320 corresponds directly with curve 310, namely $\psi(t)$ can be characterized by a sinusoid in a time interval between 0 and 1a. However, because of the sensor lock-in phenomenon, a perturbation exists in the sinusoidal shape in the time interval between time 1a and 1. The value of $\psi(t)$ at the zero rate crossing indicated by time point 1 can be extrapolated graphically to be $\psi_o^b$ derived from an assumed sinusoidal characteristic function since it would have tracked curve 310 if there were no lock-in. Herein, the subscript "o" indicates a zero rate crossing value, at $\psi$ equals 0, and the superscript "b" indicates the evaluation of $\psi(t)$ based on the characteristic "before" the crossing as opposed to superscript "a" which indicates evaluation based on the characteristic "after" the crossing. After the zero rate crossing and in the time interval between time points 1a and 1c, curve 320 could be similarly characterized by a sinusoid. However, because of the perturbation which exists about the zero rate crossing, the sinusoidal characteristic after the zero rate crossing is offset as compared to that before the zero rate crossing. That is, the sinusoidal characteristic between 0 and 1a is not continuous with the sinusoidal characteristic between 1b and 1c. Nevertheless, by obtaining phase information between the time interval 1b and 1c and using the sinusoid as an assumed characteristic function, the value of the zero rate crossing at point 1 based on information of $\psi(t)$ after the zero rate crossing can be extrapolated graphically as indicated by $\psi_o{}^a$.

The difference between $\psi_o{}^b$ and $\psi_o{}^a$ substantially represents the incremental lock-in error value as a result of the occurring zero rate condition existing at time point 1. This lock-in error value is indicated as an offset where the net rotation input angle is zero at point 1c, and the offset phase value is equal to the phase difference between $\psi_o{}^a$ and $\psi_o{}^b$. It should be noted that FIG. 3a is an exaggeration, both in form and magnitude, to illustrate the principles of the invention. The normal difference value found between the value of $\psi_o{}^b$ and $\psi_o{}^a$ is typically less than $2\pi$ radians.

In practicing the invention, separate characteristic functions of $\psi(t)$ before and after the zero rate crossing may be generated by obtaining a plurality of data points of phase difference change and time information in the region about the zero rate crossing before and after the zero rate crossing. In FIG. 3b, data points before a zero rate crossing are indicated as $\psi_n{}^b$ and data points after zero rate crossing are indicated as $\psi_n{}^a$. Separate characteristic functions before and after the zero rate crossing of $\psi(t)$ can be determined by a variety of curve fitting techniques using $\psi_n{}^b$ and $\psi_n{}^a$ data respectively. One curve fitting technique which may be used is the least squares curve fitting technique. Another curve fitting technique may be to assume a given function and determine a set of coefficients based on the data points. After the separate characteristic functions before and after zero rate crossings have been determined, the value of the zero rate crossing can be extrapolated. The difference between the zero rate crossing values, $\psi_o{}^b$ and $\psi_o{}^a$ based on a separate characteristic function before and after the ZRC is related to the occurring incremental lock-in error value.

There are a variety of techniques for obtaining the ZRC phase angle values based on assumed behavioral function characteristics. One such technique is illustrated by the graphical representation of $\psi(t)$ versus time in FIG. 2b corresponding to the intensity pattern versus time of FIG. 2a. FIG. 2a may also be considered to be the usual photodetector output signal having sinusoidal form. Each output signal zero crossing of the photodetector corresponds to a $2\pi$ radian phase change from the last output signal zero crossing having the same first and second derivative polarities. The behavior may be assumed to be parabolic, therefore, a parabolic function could be the selected characteristic function. As noted in FIG. 2a, during the time interval $T_2$ between output signal zero crossing times $T_b$ and $T_x$, the phase difference increases by $2\pi$ radians. During the time interval $T_3$, between output signal zero crossing times $T_y$ and $T_a$, the phase difference decreases by $2\pi$ radians. Between output signal zero crossing times $T_x$ and $T_y$, defining a time interval $T_1$, there are no other zero crossings, but a zero-phase rate (ZRC) crossing does occur. Based on the principle of incremental lock-in error described above, it remains to estimate a phase increase $\Delta\psi_1$ between $T_x$ and $T_o$, and to estimate a phase decrease $\Delta\psi_2$ between $T_o$ and $T_y$. $T_o$ is assumed to be $T_1/2$ time separated from both $T_x$ and $T_y$. The difference between $\Delta\psi_1$ and $\Delta\psi_2$ is the incremental lock-in error that is desired. Note that $\Delta\psi_1$ and $\Delta\psi_2$ are a fractional value of $2\pi$ and correspond to $\psi_o{}^b$ and $\psi_o{}^a$ respectively.

Assuming that the shape of the characteristic curve of the phase difference versus time illustrated in FIG. 2b is substantially parabolic, and that $\psi_o$ is substantially constant about the ZRC, $\Delta\psi_1$ and $\Delta\psi_2$ can be mathematically determined from the following:

$$\Delta\psi_1 = \tfrac{1}{2}\{YZ + 1/YZ - 2\} \tag{2}$$

$$\Delta\psi_2 = \tfrac{1}{2}\{Y/Z + Z/Y - 2\} \tag{3}$$

where:
$Y = (T_2 + T_3)/(T_2 + 2T_1 + T_3)$
$Z = T_2/T_3$ $\Delta\psi_1$ equals the ZRC phase angle as reference to pre-ZRC phase information.

$\Delta\psi_2$ equals the ZRC phase angle as reference to post-ZRC phase information. In the above analysis, time intervals $T_2$ and $T_3$ are based on an occurring selected phase change of $2\pi$ radians of the output signal which occurs prior to and after the ZRC instant. Depending on the scheme chosen, a selected phase change of $4\pi$, $\pi$ or $\pi/2$ or the like could also have been chosen. However, it is important to select a phase change very close in time to the ZRC instant in order to obtain good accuracy. Note that a selected phase change of $2\pi$ radians is easily observed since it corresponds to one fringe spacing of the interference pattern.

The average incremental lock-in error at a ZRC can be determined substantially from:

$$\Delta E = \frac{\Delta\psi_1 - \Delta\psi_2}{2} - \overline{\Delta E} \tag{4}$$

where $\overline{\Delta E}$ is the average measurement error as described earlier.

As stated earlier, the lock-in discriminant signal can be obtained by observing the historical variation in the average incremental lock-in error described by equation (4). The discriminant signal may be computed as the mean square of differences between successive pairs of average incremental lock-in errors having the same polarity of the second derivative of the phase difference and adding the mean square of the differences between successive pairs of the average incremental lock-in errors having the opposite polarity of the second derivative. This can be implemented by a linear filter approach mathematically described as follows:

$$\text{Variance}_{cw} \equiv V_{cw} = V_{cw}(\text{last}) + \\ \epsilon\{[\Delta E_{cw}(\text{new}) - \Delta E_{cw}(\text{last})]^2 - V_{cw}(\text{last})\} \tag{5}$$

$$\text{Variance}_{ccw} \equiv V_{ccw} = V_{ccw}(\text{last}) + \quad (6)$$

$$\epsilon\{[\Delta E_{ccw}(\text{new}) - \Delta E_{ccw}(\text{last})]^2 - V_{ccw}(\text{last})\}$$

$$\text{Discriminant} \equiv D = V_{ccw} + V_{cc} \quad (7)$$

where $\epsilon$ is a selected filter constant.

The reason for carrying separate computations for each of the second derivatives, namely CCW and CW, is that the lock-in rate can differ markedly as determined by the zero rate crossings between the first and second directional values of the second derivative. However, they may be accumulated together with possibly some loss in accuracy. Equations (5), (6) and (7) show just one example of obtaining a historical variation of the incremental lock-in error for obtaining a lock-in discriminant signal. This is only one example of a computation which can be performed by a variety of computational devices for obtaining historical variation information which would produce a more or less quality lock-in rate discriminant signal.

It is the principle of this invention to use the historical variation of the incremental lock-in error for obtaining a lock-in discriminant signal. Some further examples of historical variation techniques include, among others:
  (i) mean squared difference between successive parameters;
  (ii) mean squared deviation around average;
  (iii) mean absolute deviation around average;
  (iv) instant squared successive differences;
  (v) instant squared deviation from average; and
  (vi) instant absolute deviation from average.

These techniques are well known to those skilled in the art of empirical date analysis. Below, is still another approach to obtaining a historical variation which includes accounting for any measurement error or hysteresis.

$$\text{incremental error } \Delta E = \frac{\psi_o^b - \psi_o^a}{2} \quad (8)$$

$$\text{filtered average } <\Delta E>_{\text{new}} = <\Delta E>_{\text{old}} + \epsilon_1 \left( \Delta E - <\Delta E>_{\text{old}} \right) \quad (9)$$

$$\text{instant incremental lock-in error } \Delta = \left| \Delta E - <\Delta E>_{\text{new}} \right| \quad (10)$$

$$\text{historical filtered average incremental lock-in error } \Delta' = \Delta' + \epsilon_2 \{\Delta - \Delta'\} \quad (11)$$

$$\text{Discriminant} \equiv \Delta'_{cw} + \Delta'_{ccw} \quad (12)$$

Equations (8) through (11) are separately determined for ZRC's of the same polarity of $\psi_o$. The final discriminant indicated by equation (12) sums the filtered average incremental lock-in error for both polarities. As before, $\epsilon_1$ and $\epsilon_2$ represent chosen filter constants.

Figure 4:
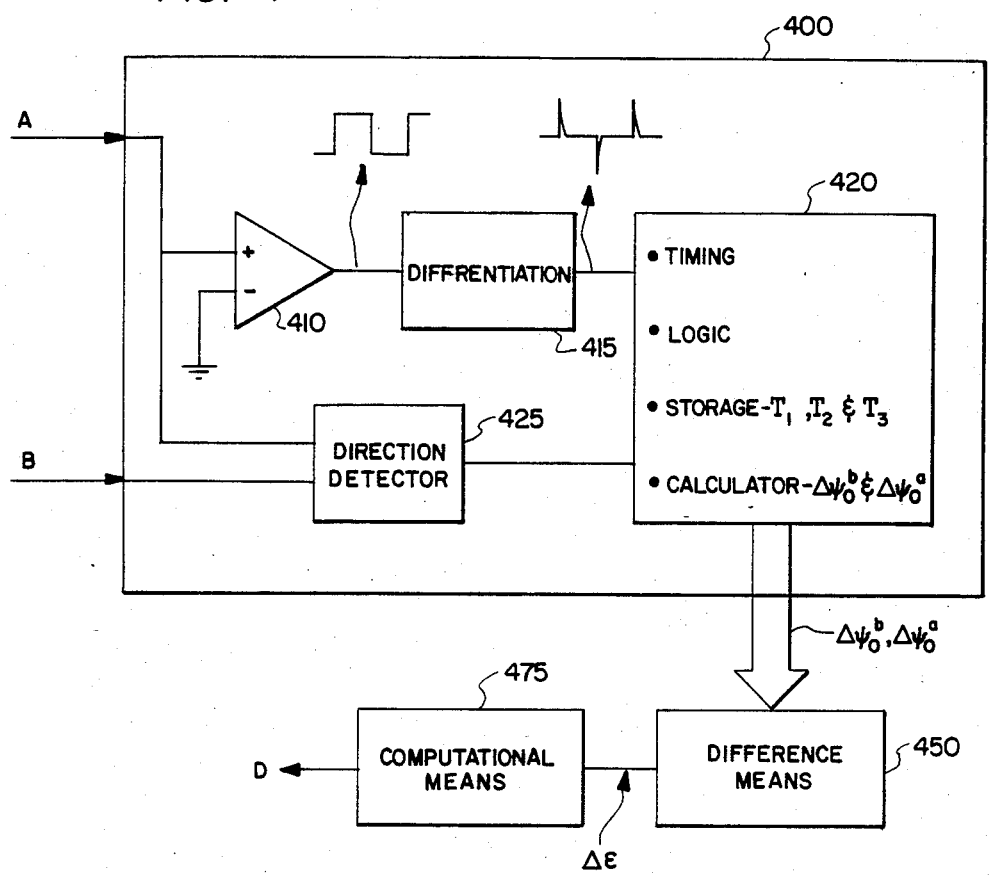
FIG. 4 is a block diagram showing one embodiment of the discriminant apparatus of the present invention.

Shown in FIG. 4 is a block diagram of a lock-in rate discriminant signal apparatus comprising zero rate phase angle determining means 400, difference means 450, and computational means 475. Shown in FIG. 4 is a zero rate phase angle determining means 400 which is essentially a signal processor responsive to phase information between the waves provided by signal means 100 responsive to the interference pattern, and namely the output signals of detectors 110 and 120 indicated as signals A and B. The purpose of zero rate phase angle determining means 400 is to obtain the value of the ZRC phase angle $\psi_o^b$ and $\psi_o^a$ as reference to pre-ZRC phase information and post-ZRC phase information respectively.

One example of zero rate phase angle determining means 400 is shown in a simplistic form as having a first operational amplifier 410 responsive to signal A. The output of amplifier 410 is fed to a signal processor 420 through a differentiator circuit 415. In the situation where a sinusoidal bias is applied, the photodetector output is a sinusoid and the output of amplifier 410 is a series of square wave pulses of varying width dependent upon the rate of rotation of the optical closed-loop path. Differentiator 415 provides output pulses indicative of each time that the output signal A goes through zero. With reference to FIG. 2a, an output pulse would be generated from differentiator 415 through each zero crossing (time axis crossing) of the sine wave shown therein. Further, direction detector 425 is shown in FIG. 4 responsive to signals A and B for providing an output signal indicative of the change of direction and the direction thereof.

Signal processor 420 responds to the output of differentiator 415 which essentially provides clocking pulses. These pulses are processed along with the output direction detector 425 by appropriate signal processor logic circuits and time-clock circuits from which the time intervals $T_1$, $T_2$, and $T_3$ can be determined in a manner as already described. Utilizing this information, the values of $\Delta\psi_1$ and $\Delta\psi_2$ can be determined as substantially shown with reference to equations (2) and (3).

The $\Delta\psi_1$ and $\Delta\psi_2$ output signal values of signal processor 420 is presented to a difference means 450 for determining the difference in accordance with equation (4) between $\Delta\psi_1$ and $\Delta\psi_2$ which is essentially the average incremental lock-in error. The output of difference means 450 is presented to a computational means for obtaining the discriminant signal which is representative of the historical variation of the difference value, $\Delta E$. Essentially computational means 475 executes the computations substantially shown and described by equations (5) through (7).

The output of the computational means 475 is the discriminant signal D of the present invention based on the historical variation of the incremental lock-in error substantially determined by "before" and "after" behavioral characteristic functions of the phase difference between the counter-propagating waves. This signal when employed in a closed-loop control system may be utilized for altering the coupling of energy between the counter-propagating waves of a ring laser angular rate sensor for affecting the lock-in rate to a minimum condition. Zero rate phase angle determining means 400, difference means 450, and computational means 475 can be implemented by a variety of analog and digital circuit combinations. Parts of each of these circuit blocks can be combined in a single signal processor such as a microprocessor and the like.

Figure 5:
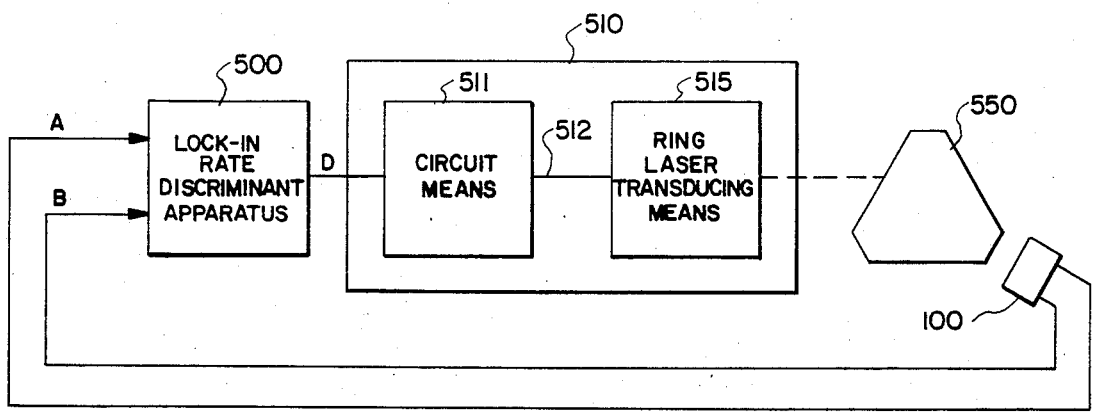
FIG. 5 is a block diagram showing the employment of the discriminant apparatus of FIG. 4 in a control system for altering the coupling of energy between the waves of a ring laser angular rate sensor.

Shown in FIG. 5 is a simplified block diagram of a control system somewhat similar to that shown in U.S. Pat. No. 4,152,071. The lock-in rate discriminant signal apparatus is indicated by block 500 having an output signal D corresponding to the output of computational means 475 of FIG. 4. The lock-in rate discriminant signal is presented to a control means 510 for altering the coupling of energy of the counter-propagating waves of a ring laser angular rate sensor 550. Control means 510 is essentially a closed-loop control system somewhat similar to that shown in U.S. Pat. No. 4,152,071 which provides a closed-loop system to obtain a minimum lock-in rate system.

Control means 510 comprises a circuit means 511 responsive to the discriminant signal provided by the lock-in rate discriminant signal apparatus 500 for providing an output signal 512 for controlling a ring laser transducing means 515. Transducing means 515 is any type of transducing means which can alter the coupling of energy of the counter-propagating waves of the ring laser sensor 550. Ring laser transducing means 515 may be an apparatus for controlling one of the plurality of wave reflecting surfaces defining the optical closed-loop path. Any alteration of one of the wave reflecting surfaces, for example tilting or translation, would alter the lasing path and hence alter the coupling of energy between the waves. Another example of ring laser transducing means may be that which can alter the lasing medium itself such as the discharge currents which too can alter the coupling of energy between the waves. Herein, "alteration of the closed-loop path" is intended to imply any means that alters the coupling of energy between the counter-propagating waves traveling along a closed-loop path.

Circuit means 511 may be a variety of closed-loop control circuits for generating an output control signal 512 for altering the sensor 550 in such a way so as to minimize the input discriminant signal D.

It should be noted that control means 510, and in particular circuit means 511, should be one with a very long time constant since the discriminant signal is based on the historical variation of the changes in the incremental lock-in errors. Control means 510 may achieve the intended function by slowly controlling the transducing means by a variable DC value plus a square wave control signal having a very low amplitude and a low-frequency—say 1 HZ compared with an alternating bias of 400 HZ. The square wave control signal is utilized for modulating the coupling of energy between the counter-propagating waves in a very slow manner about an average DC value. Circuit means 511 is such that it responds to the variation in the lock-in rate signal for varying and controlling the average DC value controlling transducing means 515 so as to obtain an average condition of transducing means 515 where the lock-in rate is a minimum. There are, of course, many closed-loop control systems possible for achieving minimum lock-in rate.

In the foregoing description of the embodiments of the invention shown in the accompanying drawings, the characteristic behavior of $\psi(t)$ determined before and after a ZRC is determined so that the value of the ZRC phase angle can be extrapolated based on data before and after the occurrence of the ZRC phase angle. From this information, the average incremental lock-in error value can be determined by a simple difference calculation. These values are historically observed for obtaining a value indicative of the historical variation in the average incremental lock-in error values. Obviously, many modifications and variations of the present invention are possible in light of the above teachings. Particularly, the methods used for curve fitting and/or assumed characteristic functions have a wide range of possibilities. A wide range of choices of historical variation analysis has been disclosed. Also the method of determining the ZRC phase angle instant as well as the angle has wide variations in design and accuracy. The ZRC phase angle measurement has been shown utilizing a time measurement technique, but an analog technique of sample and hold could also be implemented. The accuracy of the system is, of course, dependent upon how accurately can a characteristic function be described and how accurately the value of the ZRC phase angle can be determined through extrapolation.

It should also be noted that the lock-in rate discriminant signal apparatus of the present invention may be employed in a variety of closed-loop control systems for altering the sensor in such a way so as to achieve minimum lock-in rate. It should be also noted that a variety of biasing techniques, closed-loop path configurations, and electrical magnetic waves are, of course, possible in practicing a ring laser angular rate sensor. It is, therefore, to be understood that within the scope of the depending claims the invention may be practiced otherwise as specifically described.

The embodiments of the invention in which an exclusive property or right is claimed are defined as follows:

1. An apparatus for providing a discriminant signal indicative of lock-in rate of a ring laser angular rate sensor of the class wherein two waves propagate in opposite directions along a closed-loop path, wherein the frequency of each of said waves is a function of the rate of rotation of said closed-loop path, there being a time varying phase difference therebetween, in the presence of rotation, and wherein said sensor provides an output signal indicative of the rotation of said closed-loop path, the apparatus comprising:

biasing means for affecting the frequency of at least one of said waves to alternate the sign of the frequency difference between said waves;

signal means responsive to said waves for providing at least one output signal related to said phase difference between said waves;

phase angle determining means for determining first and second zero rate crossing phase values of said phase difference at occurrences of selected zero rate crossings of said phase difference, said zero rate phase angle determining means includes,
  means for determining said first phase value as a function of the behavior of said phase difference before a zero rate crossing, and
  means for determining said second phase value as a function of the behavior of said phase difference after a zero rate crossing, and difference means for determining a difference value between said first and second phase values;

means for determining a historical variation of said difference value as a function of said difference values of a plurality of zero rate crossing occurrences to produce said discriminance signal indicative of said lock-in rate.

2. The apparatus of claim 1 further comprising:
control means responsive to said discriminant signal for altering said closed-loop path to a condition where said lock-in rate is substantially a minimum.

3. The apparatus of claim 1 wherein:
said signal means provides first and second output signals related to said phase difference between said waves such that said first and second output signals are separated in phase; and
said phase angle determining means is adapted to respond to a portion of each of said first and second output signals occurring substantially prior to said zero rate crossing for producing said first phase value, and adapted to respond to a portion of each of said first and second output signals substantially subsequent to said zero rate crossing for producing said second phase value.

4. The apparatus of claim 1 wherein said waves are electromagnetic waves in the form of laser beams propagating in opposite directions.

5. The apparatus of claim 1 wherein said closed-loop path is in the form of a triangular shape.

6. The apparatus of claim 1 wherein said biasing means including means for oscillating said closed-loop path in a rotational mode back and forth.

7. The apparatus of claim 1 wherein said biasing means includes separating means positioned in the path of said waves for altering the frequency of at least one of said waves.

8. The apparatus of claim 1 wherein said phase angle determining means includes:
means responsive to said at least one output signal for generating time data consisting of elapsed times between selected changes in said phase difference between said waves;
means for determining a first one of said elapsed times during which there exists one of said zero rate crossings;
characterizing means adapted to respond to selected ones of said time data occurring before said selected zero rate crossings for determining a first characteristic function descriptive of said time varying phase difference before said zero rate crossing, and adapted to respond to selected ones of said time data occurring after said zero rate crossing for determining a second characteristic function descriptive of said time varying phase difference after said zero rate crossing;
means for determining said first phase value as a function of said first elapsed time and said first characteristic function; and
means for determining said second phase value as a function of said first elapsed time and said second characteristic function.

9. The apparatus of claim 1 wherein said phase angle determining means includes:
means for determining a first elapsed time, $T_1$, between selected first and second signal values of said signal means output signal in which said first signal value occurs prior to said zero rate crossing and said second signal value occurs subsequent to said zero rate crossing;
means for determining a second elapsed time, $T_2$, between said first signal value and a third signal value in which said third signal value occurs before said first signal value and in which said phase difference between said waves changes by a first selected phase change during said second elapsed time;
means for determining a third elapsed time, $T_3$, between said second signal value and a fourth signal value occurring after said second signal value and in which said phase difference between said wave changes by a second selected phase change;
computation means for determining said first and second phase values as a function of said first elapsed time, said second elapsed time, and said third elapsed time.

10. The apparatus of claim 9 wherein said computation means includes means for determining said first and second phase values, $\Delta\psi_1$ and $\Delta\psi_2$ respectively, substantially in accordance with:

$$\Delta\psi_2 = \tfrac{1}{4}\{YZ + 1/YZ - 2\}$$

$$\Delta\psi_2 = \tfrac{1}{4}\{Y/Z + Z/Y - 2\}$$

where
$Y = (T_1 + T_3)/(T_1 + 2T_2 + T_3)$
$Z = T_1/T_4$, and
$T_2$ corresponds to said first selected phase change of $(2n-1)\pi$ radians, and the time interval between said third value and said selected occurrence is less than $4\pi$ radians; and
$T_3$ corresponds to said second selected phase change of $(2n-1)\pi$ radians where n is a positive integer, and the time interval between said selected occurrence and said fourth value is less than $4\pi$ radians.

11. The apparatus of claim 1 wherein said computational means includes means for determining historical variation substantially defined by:

$$\text{Variance} \equiv V = V(\text{last}) + \epsilon\{(\Delta\psi_2 - \Delta\psi_1)^2 - V(\text{last})\}$$

where
$\epsilon$ = constant variance factor
$\Delta\psi_2 - \Delta\psi_1$ = said difference value
$V(\text{last})$ = historical variation.

12. The apparatus of claim 1 wherein said computational means includes means for determining said historical variation substantially in accordance with:

Variance
$(\psi = +) V_{ccw} = V_{ccw}(\text{last}) + [E_{ccw}(\text{new}) - E_{ccw}(\text{last})]^2 - V_{ccw}(\text{last})$ Variance
$(\psi = -) V_{cw} = V_{cw}(\text{last}) + [E_{cw}(\text{new}) - E_{cw}(\text{last})]^2 - V_{cw}(\text{last})$ Historical Variation = $V_{ccw} + V_{cw}$ where:

$(\psi_2 - \psi_1)/2$ $\psi_1$ is said first phase value,
$\psi_2$ is said second phase value,
E is a selected filter constant,
$\psi 32 +$ is the positive polarity of the second derivitive of said phase relationship, and $\psi = -$ is the negative polarity of the second derivitive of said second phase relationship.

13. The apparatus of claim 1 wherein said signal means includes:
means for heterodyning a portion of each of said waves for forming an interference pattern; and
photodetection means responsive to said interference pattern for providing said at least one output signal indicative of said phase difference between said waves.

14. A method for obtaining a discriminant signal indicative of the lock-in rate of a ring laser angular rate sensor of the class wherein two waves propagate in opposite directions along a closed-loop path, wherein the frequency of each of said waves is a function of the rate of rotation of said closed-loop, and there being a time varying phase difference therebetween, and wherein said sensor includes a biasing means for affecting the frequency of at least one of said waves to alternate the sign the frequency difference between said waves, the method comprising the steps of:

generating a phase signal representative of the behavior of said phase difference between said waves;

characterizing the behavior of said phase signal based on the behavior of said phase difference occurring substantially prior to a zero rate crossing of said phase difference;

extracting a first phase value at selected occurrences of a zero rate crossing of said phase difference and which said second derivative is of a first polarity based on the characteristic behavior of said phase signal substantially prior to said zero rate crossing;

extracting a second phase value at selected occurrences of a zero rate crossing of said phase difference and which said second derivative is of a second polarity based on the characteristic behavior of said phase signal substantially prior to said zero rate crossing;

determining the difference values between said first and second phase values corresponding to the same one of said zero rate crossings; and computing the historical variation of said difference values, said discriminant signal being directly related to said historical variation.

* * * * *